1,811,623

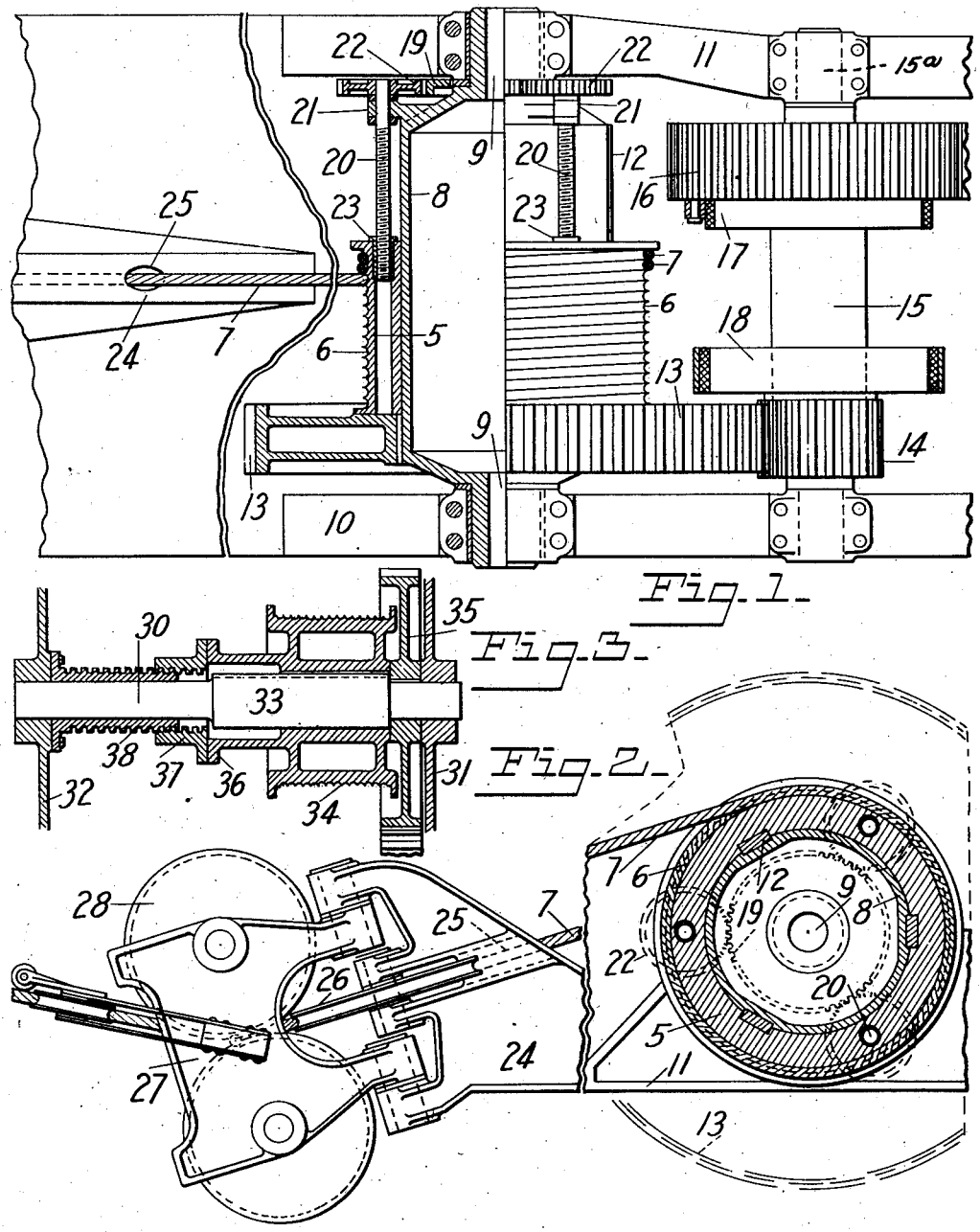
June 23, 1931. B. S. FERGUSON 1,811,623
SELF ALIGNING CABLE DRUM
Filed June 8, 1928
INVENTOR.
BERLIN S. FERGUSON.
ATTORNEY Patented June 23, 1931

UNITED STATES PATENT OFFICE

BERLIN S. FERGUSON, OF MARION, OHIO, ASSIGNOR TO THE MARION STEAM SHOVEL COMPANY, OF MARION, OHIO, A CORPORATION OF OHIO

SELF-ALIGNING CABLE DRUM

Application filed June 8, 1928. Serial No. 283,976.

This invention relates to a self-aligning cable drum and is designed more particularly for use with drag line excavators and the like.

One object of the invention is to provide a drum having a cable groove with means for maintaining the groove substantially parallel with the cable at the point where the cable passes onto the drum.

A further object of the invention is to provide a cable drum having means for moving the same axially as the cable is wound thereon.

A further object of the invention is to provide such a mechanism which will be simple in its construction and operation and which may be easily controlled.

Other objects of the invention will appear as the mechanism is described in detail.

In the accompanying drawings Fig. 1 is a plan view, partly broken away, of an apparatus embodying my invention; Fig. 2 is a side elevation of the same, partly broken away, and with the drum in section; and Fig. 3 is a longitudinal sectional view of a modified form of drum operating mechanism.

In these drawings I have illustrated certain embodiments of my invention and have shown the same as designed primarily for use in connection with the cable of a drag line excavator but it will be understood that these embodiments have been chosen for the purpose of illustration only, that the apparatus may take various forms and may be utilized in connection with machines of various kinds without departing from the spirit of the invention.

In that form of the invention illustrated in Figs. 1 and 2 the apparatus comprises a cable drum 5 provided with a spiral cable groove 6 to receive the cable 7. The cable drum is mounted on a rotatable support, which, as here shown, comprises a cylindrical member or inner drum 8 having at its ends trunnions 9 which are journaled in suitable bearings on frame members 10 and 11. The cable drum is so mounted on the supporting member that it will rotate therewith but will be capable of axial movement with relation thereto, it being in the present instance connected with the supporting member by means of keys or splines 12.

The supporting member or inner drum may be rotated in any suitable manner. In the present instance, a gear 13 is rigidly secured thereto near one end thereof and this gear meshes with a pinion 14 on a sleeve 15, which sleeve is rotatably mounted on a shaft 15a. The sleeve is driven from the shaft through a gear 16, which may be connected with any suitable source of power, and a clutch 17 by means of which the gear and sleeve may be connected or disconnected at will, thus making it possible to disengage the drag unit by means of the clutch. The sleeve 15 is also provided with a brake 18 by means of which the rotation of the drum may be controlled.

As the cable drum is rotated to wind the cable thereon axial movement is imparted thereto to maintain the groove in substantial parallelism with the cable at the point where the cable passes onto the drum and to this end the axial movement of the drum upon each complete rotation thereof is substantially equivalent to the pitch of the groove in the cable drum. This axial movement may be imparted to the drum in any suitable manner but is preferably controlled by the rotation of the cable drum itself. As shown in Figs. 1 and 2, an annular gear 19 is rigidly secured to the frame member 11 concentric with the axis of the supporting member or inner drum 8. A series of screws 20, in the present instance three, extend lengthwise of the drum and are rotatably mounted in bearing lugs 21 carried by the supporting member, and are held against lengthwise movement with relation thereto. Mounted on the outer ends of the screws 20 are gears 22 which mesh with the fixed annular gear 19. The inner portions of the screws are threaded into the nuts or threaded openings 23 in the cable drum. Consequently when the inner drum or supporting member is rotated the gears 22 will travel about the fixed annular gear and will rotate the screws 20, thereby causing the same to travel in the nuts 23 to impart axial movement to the cable drum.

The cable 7 preferably passes about a guide which is fixed with relation to the drum and inasmuch as the drum is shifted axially a distance corresponding to the amount of cable wound thereon the cable will at all times be substantially parallel with the cable groove at the point where the cable passes onto the drum, thereby preventing the cable from climbing over the side wall or edge of the groove, from chafing or from being otherwise injured, as would result if the cable extended at an angle to the groove.

The guide may take any suitable form and, as here shown, it comprises what is known as a "fair-lead" which consists of a bracket 24 mounted in fixed relation to the drum and having an opening 25 through which the cable extends. Mounted on the bracket 24 are two substantially horizontal sheaves 26 between which the cable passes as it is moved toward and from the drum. Pivotally mounted on the bracket 24 is a supplemental bracket 27 having mounted therein two substantially vertical sheaves 28 which also receive the cable between them. The horizontal sheaves being fixed against bodily movement will maintain the cable against displacement lengthwise of the drum and the vertical sheaves will swing about the axis of the supplemental bracket to permit the turning or bending of the cable with relation to the horizontal sheaves.

It will be obvious that the longitudinal movement may be imparted to the cable drum in various ways and, in Fig. 3, I have shown a modified form of screw operated means for so actuating the drum. As there shown, the supporting member comprises a shaft 30 journaled at its ends in suitable bearings on frame members 31 and 32. This shaft has an enlarged portion 33 on which the cable drum 34 is slidably mounted but is held against rotation with relation to the supporting member. Rigidly secured to the supporting member or shaft is a gear 35 by means of which it may be rotated from a suitable source of power. The cable drum 34 has an elongated hub portion 36 to which is secured a nut 37 which receives a screw 38 arranged about the shaft but rigidly secured at its outer end to the frame member 32. Thus as the supporting member or shaft is rotated the nut will travel along the screw and impart longitudinal movement to the cable drum.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a mechanism of the character described, a frame having bearings, a supporting member having trunnions journaled in said bearings, a drum mounted on said supporting member for rotation therewith and for axial movement with relation thereto, means for rotating said supporting member, screws rotatably mounted on said supporting member, extending lengthwise thereof and held against axial movement, nuts carried by said drum to receive said screws, gears secured to the respective screws at one end of said supporting member, and a gear rigidly mounted on said frame concentric with the axis of said supporting member and meshing with the gears on said screws.

2. In a mechanism of the character described, a rotatable supporting member, a drum slidably mounted on said supporting member for rotation therewith and comprising a peripheral portion having longitudinal openings therein, each opening having a screw threaded portion, means for rotating said supporting member, screws rotatably mounted on said supporting member, held against axial movement with relation thereto and extending into the respective screw threaded openings in said drum, and means controlled by the rotation of said supporting member for simultaneously rotating said screws.

3. In a mechanism of the character described, a rotatable supporting member of relatively large diameter, means for rotating said supporting member, a drum comprising a cylindrical shell having an outer cable engaging portion and fitting closely about and having sliding engagement with said supporting member and held against rotation with relation thereto, said shell having a plurality of longitudinal openings each provided with a screw threaded portion, a plurality of screws rotatably mounted on said supporting member and extending into the respective openings in said shell, gears secured to the respective screws, and a fixed annular gear concentric with the axis of said supporting member and meshing with the gears on said screws.

In testimony whereof, I affix my signature hereto.

BERLIN S. FERGUSON.